(12) United States Patent
Yanase

(10) Patent No.: US 10,591,040 B2
(45) Date of Patent: Mar. 17, 2020

(54) DIFFERENTIAL DEVICE

(71) Applicant: MUSASHI SEIMITSU INDUSTRY CO., LTD., Toyohashi-shi, Aichi (JP)

(72) Inventor: Yoichi Yanase, Toyohashi (JP)

(73) Assignee: Musashi Seimitsu Industry Co., Ltd., Aichi (JP)

( * ) Notice: Subject to any disclaimer, the term of this patent is extended or adjusted under 35 U.S.C. 154(b) by 0 days.

(21) Appl. No.: 16/171,801

(22) Filed: Oct. 26, 2018

(65) Prior Publication Data

US 2019/0128397 A1 May 2, 2019

(30) Foreign Application Priority Data

Oct. 30, 2017 (JP) ................................ 2017-209350

(51) Int. Cl.
*F16H 48/40* (2012.01)
*F16H 48/38* (2012.01)
*F16H 48/08* (2006.01)

(52) U.S. Cl.
CPC ............. *F16H 48/40* (2013.01); *F16H 48/38* (2013.01); *F16H 48/08* (2013.01); *F16H 2048/085* (2013.01); *F16H 2048/385* (2013.01)

(58) Field of Classification Search
None
See application file for complete search history.

(56) References Cited

U.S. PATENT DOCUMENTS

| 8,876,649 | B2* | 11/2014 | Uchida | F16H 48/38 475/220 |
| 2001/0039228 | A1* | 11/2001 | Eulenstein | F16H 48/08 475/230 |
| 2008/0229878 | A1* | 9/2008 | Kohno | F16H 48/08 74/606 R |
| 2015/0184734 | A1* | 7/2015 | Yanase | F16H 48/38 29/893.1 |
| 2016/0290466 | A1* | 10/2016 | Yanase | F16H 48/40 |

FOREIGN PATENT DOCUMENTS

JP 2011-167746 A 9/2011

* cited by examiner

*Primary Examiner* — Justin Holmes
(74) *Attorney, Agent, or Firm* — Carrier Blackman & Associates, P.C.; Joseph P. Carrier; William D. Blackman

(57) ABSTRACT

In a differential device including a differential case having a case main body with an access window, a flange part includes: a first flange part outside a region sandwiched by paired imaginary straight lines passing through an axis and inner ends, on one and another sides in a peripheral direction of the case, of the window when viewed on a projection plane orthogonal to the axis; and the second flange part in the region. The second flange part includes a predetermined region spaced in the peripheral direction from a border part with the first flange part and capable of avoiding stress concentration around a degassing passage in the predetermined region when a thrust load acts on the flange part so as to generate stress resisting inclination thereof. The degassing passage is disposed only in the first flange part, only in the predetermined region, or only in both of them.

8 Claims, 15 Drawing Sheets

DIFFERENTIAL DEVICE

BACKGROUND OF THE INVENTION

Field of the Invention

The present invention relates to a differential device and, in particular, to a differential device includes a differential case that has a hollow case main body and an annular flange part projectingly provided integrally with an outer peripheral face of the case main body and that is rotatable around a predetermined axis, a differential mechanism that is housed within the case main body, an access window that is provided in the case main body in order to allow the differential mechanism to be assembled into the case main body, and a ring gear that meshes with a drive gear linked to a power source and transmits power from the drive gear to the differential case, the ring gear having a structure in which it has a tooth part that receives a thrust load in a direction along the axis by meshing with the drive gear.

Description of the Related Art

Such a differential device is known as disclosed in Japanese Patent Application Laid-open No. 2011-167746.

In a differential case of the differential device disclosed in Japanese Patent Application Laid-open No. 2011-167746, an outer peripheral face of a flange part has a joining part via which it is joined to an inner peripheral face of a ring gear by welding, a fitting face part that is fitted into the inner peripheral face of the ring gear by press fitting, a space-forming part positioned between the joining part and the fitting face part and forming a blocked space between itself and the inner peripheral face of the ring gear, and a degassing groove (degassing passage) providing communication between the blocked space and an outer face of the differential case. In this structure, since gas generated when welding the ring gear as above can be discharged smoothly via the degassing groove, it is effective in preventing the occurrence of welding failure.

Here, of the flange part, that positioned outside a region sandwiched between a pair of imaginary straight lines each passing through the axis of the differential case and an inner end on one side or an inner end on the other side, in the peripheral direction of the differential case, of an access window when viewed on a projection plane orthogonal to the axis (that is, a region offset from the access window in the peripheral direction) is defined as a first flange part, and that positioned in the region (that is, in the same position as for the access window in the peripheral direction) is defined as a second flange part; in relation to the access window, there is a considerable difference in the rigidity via which the first and second flange parts are supported by the case main body. That is, the rigidity of the second flange part, which is present at a position corresponding to the access window (that is, the same position as the access window in the peripheral direction) and for which strong support by the differential case main body cannot be expected, is considerably lower than the rigidity of the first flange part, which is present at a position offset in the peripheral direction with respect to the access window and is strongly supported on the differential case main body.

When a thrust load transmitted from a drive gear to the ring gear while the differential device is operating acts on the flange part of the differential case, the flange part experiences a stress that resists inclination of the flange part toward the differential case axis side due to the thrust load. In this process, in particular, compared with a region of the second flange part that is close to the middle in the peripheral direction, in a region of the second flange part that is relatively close to a border part with the first flange part, a difference in stress in the peripheral direction (in other words, the change gradient in the peripheral direction of the amount of inclination when the second flange part starts to incline slightly) becomes large in relation to the difference in rigidity between the first and second flange parts. If the degassing groove is disposed in a region where the change gradient in the amount of inclination is large, as also shown in for example FIG. 15, a considerable difference is caused in the amount of inclination between one end and the other end in the peripheral direction of the degassing groove. Therefore, a concentration of stress easily occurs in an area around the degassing groove (in particular a groove bottom part) due to the difference in amount of inclination, and there is a possibility that the durability of the differential case will be degraded.

SUMMARY OF THE INVENTION

The present invention has been proposed in light of the above circumstances, and it is an object thereof to provide a differential device that enables a concentration of stress in an area around a degassing passage to be avoided even when the passage is provided in a flange part of a differential case.

In order to achieve the object, according to a first aspect of the present invention, there is provided a differential device comprising a differential case that has a hollow case main body and an annular flange part projectingly provided integrally with an outer peripheral face of the case main body and that is rotatable around a predetermined axis, a differential mechanism that is housed within the case main body, an access window that is provided in the case main body on one side, in a direction along the axis, of the flange part in order to allow the differential mechanism to be assembled into the case main body, and a ring gear that meshes with a drive gear linked to a power source and transmits power from the drive gear to the differential case, the ring gear having a tooth part that receives a thrust load in a direction along the axis by meshing with the drive gear, an outer peripheral part of the flange part having a joining part joined to an inner peripheral face of the ring gear by welding, a fitting face part fitted into the inner peripheral face of the ring gear, and a space-forming part positioned between the joining part and the fitting face part and forming a blocked space between the outer peripheral part of the flange part and the inner peripheral face of the ring gear, a degassing passage being provided in the flange part, and the degassing passage providing communication between the blocked space and an outer face of the differential case, wherein the flange part comprises a first flange part and a second flange part, the first flange part being positioned outside a region sandwiched by a pair of imaginary straight lines passing through the axis and inner ends, on one side and on an other side in a peripheral direction of the differential case, of the access window when viewed on a projection plane orthogonal to the axis, and the second flange part being positioned in the region, the second flange part includes a predetermined region spaced in the peripheral direction from a border part with the first flange part, the predetermined region being a region that can avoid a concentration of stress in an area around the degassing passage present in the predetermined region when a thrust load acts on the flange part so as to give rise to stress resisting inclination of the flange part toward the axis side, and the degassing passage is disposed only in the first flange part, only in the predetermined region of the second flange part, or only in the first flange part and the predetermined region out of an entire periphery of the flange part.

In order to achieve the object, according to a second aspect of the present invention, there is provided a differential device comprising a differential case that has a hollow case main body and an annular flange part projectingly provided integrally with an outer peripheral face of the case main body and that is rotatable around a predetermined axis, a differential mechanism that is housed within the case main body, an access window that is provided in the case main body on one side, in a direction along the axis, of the flange part in order to allow the differential mechanism to be assembled into the case main body, and a ring gear that meshes with a drive gear linked to a power source and transmits power from the drive gear to the differential case, the ring gear having a tooth part that receives a thrust load in a direction along the axis by meshing with the drive gear, an outer peripheral part of the flange part having a joining part joined to an inner peripheral face of the ring gear by welding, a fitting face part fitted into the inner peripheral face of the ring gear, and a space-forming part positioned between the joining part and the fitting face part and forming a blocked space between the outer peripheral part of the flange part and the inner peripheral face of the ring gear, a degassing passage being provided in the flange part, and the degassing passage providing communication between the blocked space and an outer face of the differential case, wherein the flange part comprises a first flange part and a second flange part, the first flange part being positioned outside a region sandwiched by a pair of imaginary straight lines passing through the axis and inner ends, on one side and on an other side in a peripheral direction of the differential case, of the access window when viewed on a projection plane orthogonal to the axis, and the second flange part being positioned in the region, and the degassing passage is disposed only in the first flange part, only in a middle part, in the peripheral direction, of the second flange part, or only in the first flange part and the middle part out of an entire periphery of the flange part.

In accordance with the first and second aspects, in the differential case in which the rigidity of the second flange part, which is present at a position corresponding to the access window and for which strong support by the differential case main body cannot be expected, is lower than the rigidity of the first flange part, which is present at a position offset in the peripheral direction with respect to the access window and is strongly supported by the differential case main body, the degassing passage is disposed in a region, where there is no or hardly no difference in stress in the peripheral direction (in other words, the change gradient in the peripheral direction in the amount of inclination), of the flange part when a thrust load from the ring gear acts on the flange part and stress resisting inclination occurs. This enables a concentration of stress in an area around the degassing passage of the flange part to be avoided, thus contributing to improvement of the durability of the differential case.

According to a third aspect of the present invention, in addition to the first or second aspect, a plurality of the degassing passages are present and disposed at equal intervals in the peripheral direction.

In accordance with the third aspect, due to there being a plurality of degassing passages, it is possible to make the cross-sectional area of each degassing passage as small as possible while ensuring that there is a necessary degassing effect, the difference in stress (that is, the difference in amount of inclination) between an area around one end and an area around the other end in the peripheral direction of the degassing passage can be further decreased, and a concentration of stress in the area around the degassing passage can reliably be avoided. Moreover, due to the plurality of degassing passages being disposed at equal intervals in the peripheral direction of the differential case, the degassing effect can be made substantially uniform regardless of the position of the welding.

According to a fourth aspect of the present invention, in addition to any one the first to third aspects, there is provided the differential device, in which the differential case is cast using a plurality of molds that can define a molding cavity for the differential case therebetween, wherein all of a plurality of groove molding parts for respectively molding a plurality of degassing passages provided in an outer peripheral part of the flange part are provided on any one of the plurality of molds.

In accordance with the fourth aspect, since all of the plurality of groove molding parts for respectively molding a plurality of degassing passages are provided on any one of the plurality of molds, compared with a case in which the groove molding parts are provided in a dispersed manner on a plurality of molds, it is possible to suppress variation in the positions of the plurality of degassing passages, thereby enhancing the precision in molding the degassing passages.

The above and other objects, characteristics and advantages of the present invention will be clear from detailed descriptions of the preferred embodiments which will be provided below while referring to the attached drawings.

DESCRIPTION OF THE PREFERRED EMBODIMENTS

Embodiments of the present invention are explained below by reference to the attached drawings.

Figure 1:
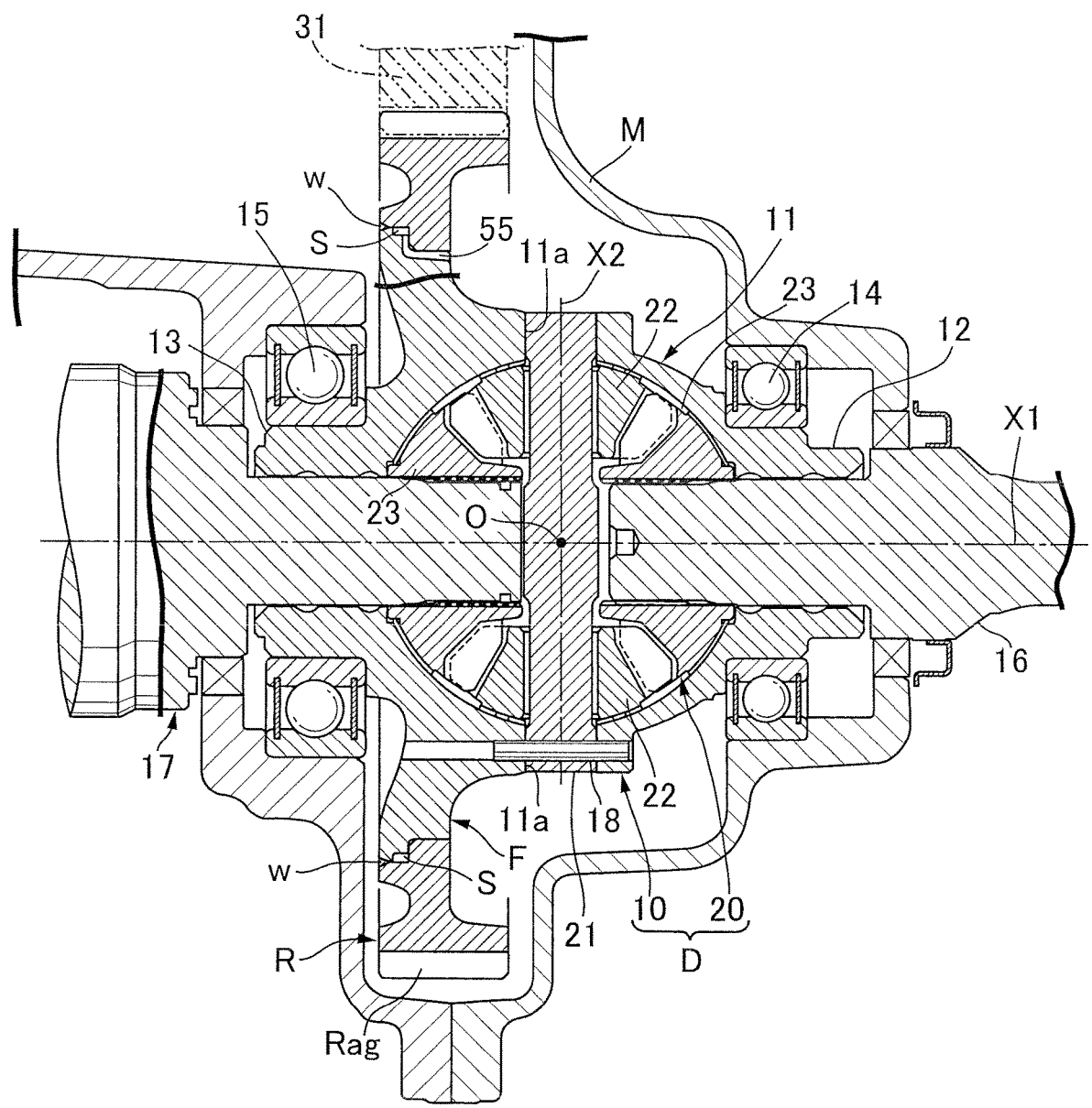
FIG. 1 is a vertical sectional view of a first embodiment of a differential device of the present invention and a transmission case housing same.

In FIG. 1, a differential device D is housed within a transmission case M of a vehicle (e.g. an automobile). The differential device D includes a differential case 10 and a differential mechanism 20 installed within the differential case 10.

The differential case 10 includes a hollow case main body 11 housing in its interior the differential mechanism 20, and first and second bearing bosses 12 and 13 connectedly provided integrally with right and left parts of the case main body 11 and arranged on a first axis (predetermined axis) X1. These first and second bearing bosses 12 and 13 are supported on the transmission case M via bearings 14 and 15 so as to be rotatable around the first axis X1 and left and right axles (drive shafts) 16 and 17 are rotatably fitted into and supported by the first and second bearing bosses 12 and 13.

The differential mechanism 20 includes a pinion shaft 21 disposed on a second axis X2 orthogonal to the first axis X1 and retained by the differential case 10, a pair of pinion gears 22 rotatably supported on the pinion shaft 21, and a pair of side gears 23 each spline joined to inner end parts of the left and right axles 16 and 17 and meshing with the respective pinion gear 22. A back face of each of the pinion gear 22 and side gear 23 is rotatably supported by an inner face of the case main body 11. In this embodiment, the inner face of the case main body 11 is illustrated as a spherical face, but this may be a tapered face or a plane orthogonal to the first axis X1 or the second axis X2.

The pinion shaft 21 is inserted through and retained by a pair of support holes 11a formed in an end part on the outer periphery of the case main body 11 and extending on the second axis X2. Furthermore, a retaining pin 18 extending so as to intersect one end part of the pinion shaft 21 is insertion fitted (e.g. press fitted) into the case main body 11, and this retaining pin 18 prevents the pinion shaft 21 from disengaging from the support hole 11a.

Furthermore, an annular flange part F is formed integrally with the outer peripheral face of the case main body 11 at a position offset from its center O toward the second bearing boss 13 side so as to face outward in the radial direction. A ring gear R is fixed to an outer peripheral part of the flange part F, and the ring gear R meshes with a drive gear 31, which is an output part of a transmission device connected to a power source (e.g. an engine), which is not illustrated. This allows a rotational driving force from the drive gear 31 to be transmitted to the case main body 11 via the ring gear R and the flange part F.

The rotational driving force thus transmitted to the case main body 11 is distributed between the left and right axles 16 and 17 via the differential mechanism 20 and transmitted while allowing differential rotation. Since the differential function of the differential mechanism 20 is conventionally known, explanation thereof is omitted.

Figure 2:
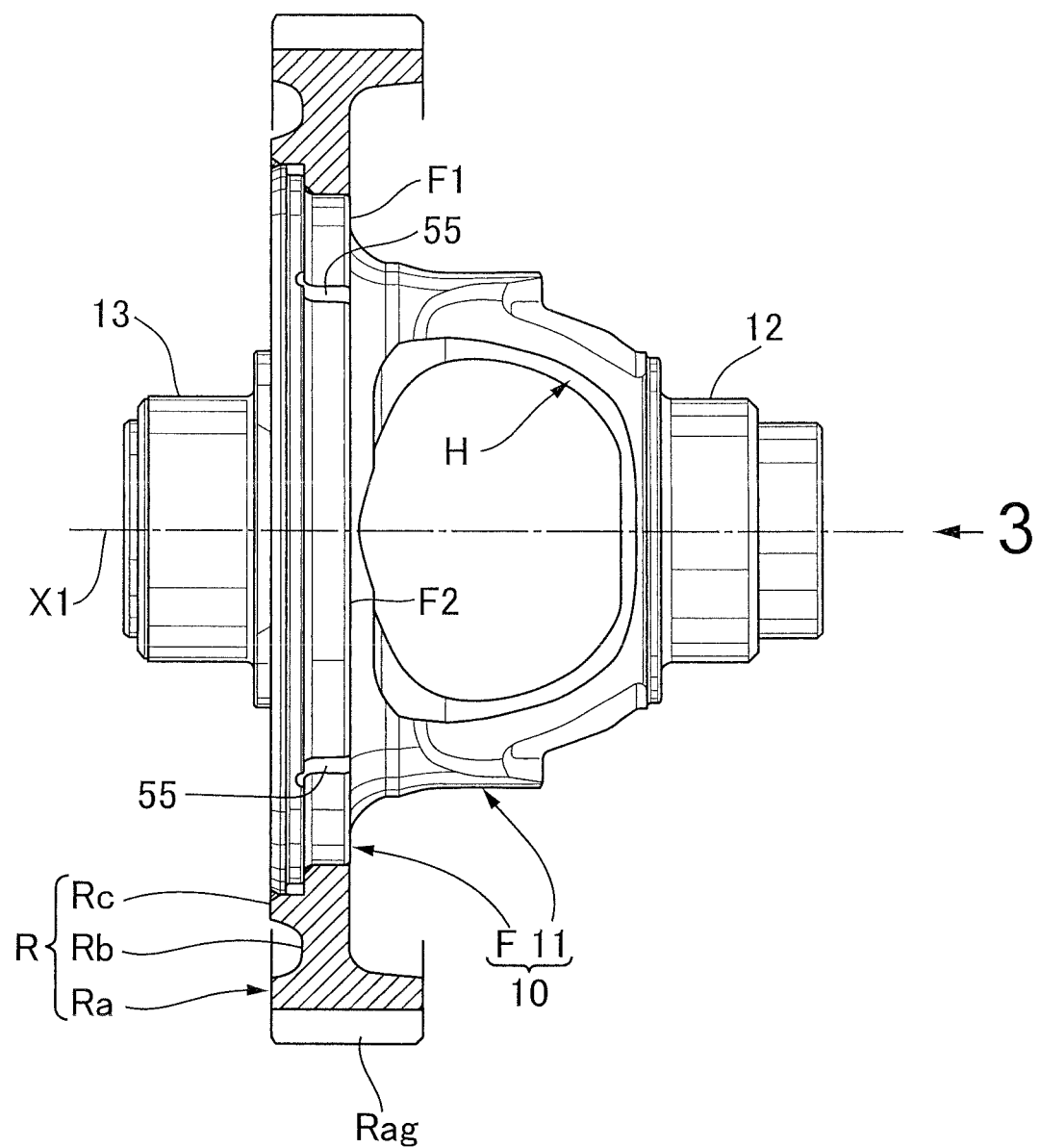
FIG. 2 is a plan view of a differential case of the differential device in a state in which access windows are present thereabove and therebelow.
Figure 3:
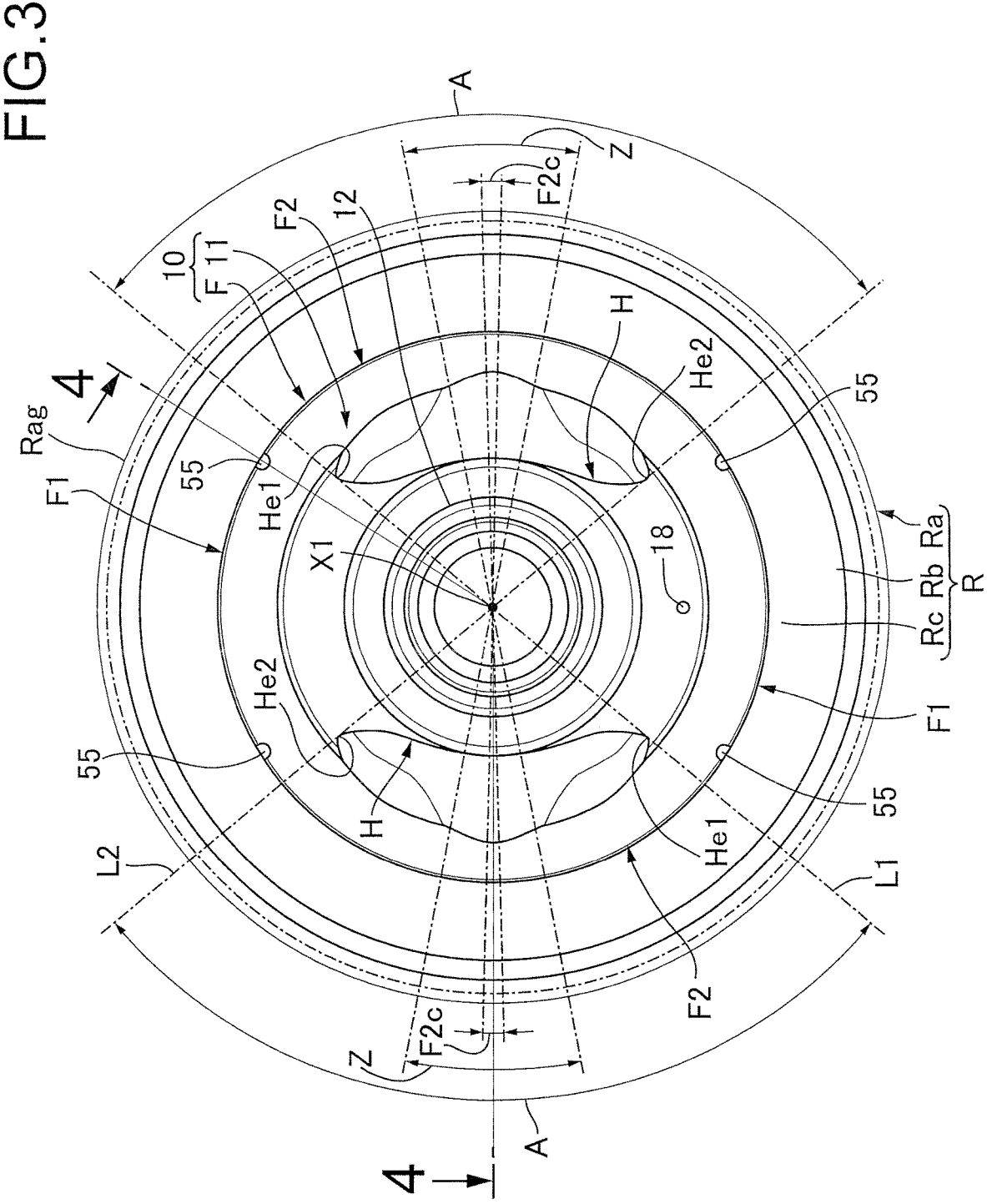
FIG. 3 is a side view of the differential case when viewed from the side further from a ring gear (view in the direction of arrow 3 in FIG. 2).
Figure 4:
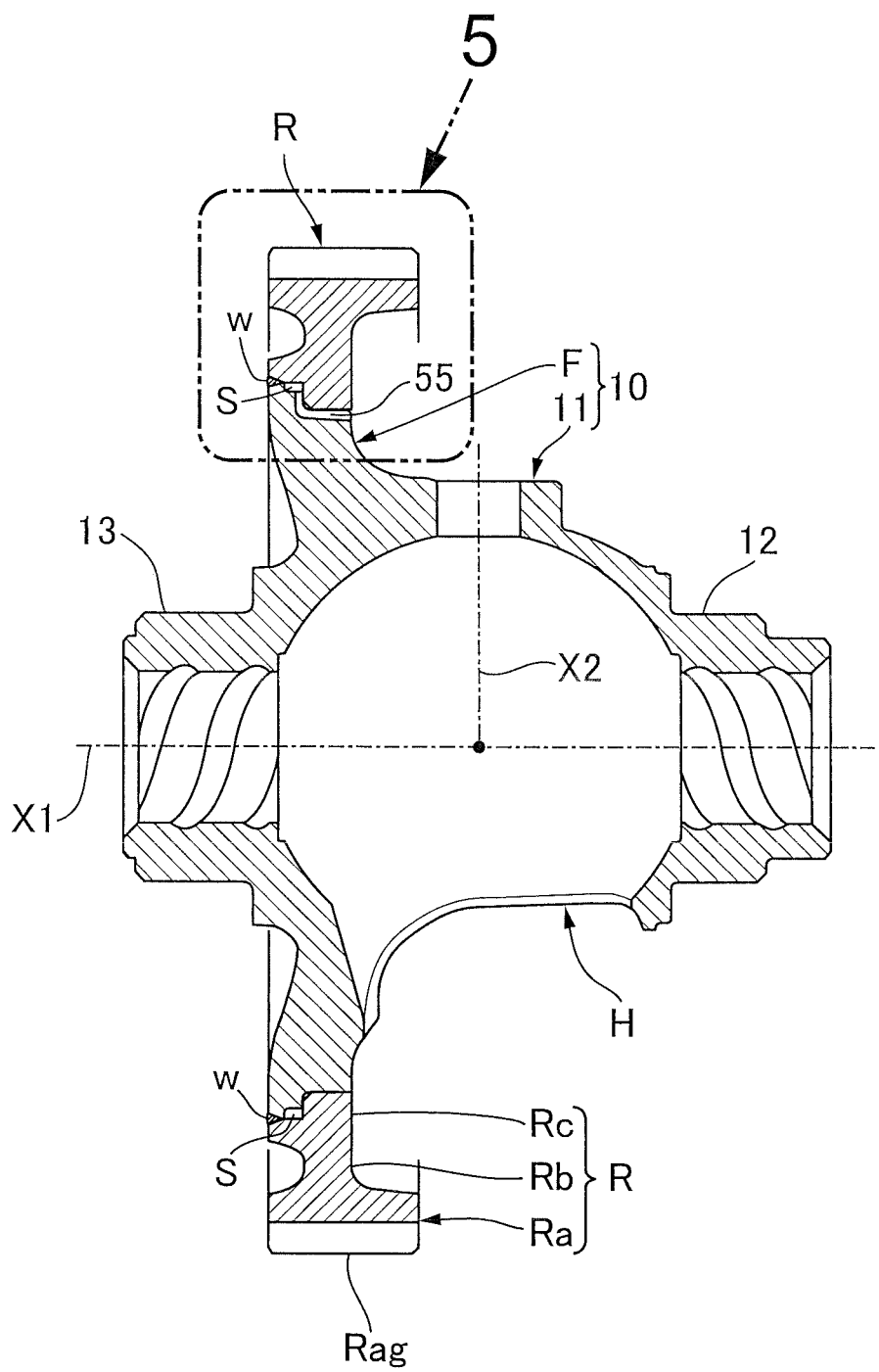
FIG. 4 is a sectional view along line 4-4 in FIG. 3.

As shown in FIG. 2 to FIG. 4, a pair of access windows H are provided in peripheral walls, opposing each other on one diameter orthogonal to the first and second axes X1 and X2, of the case main body 11, the access windows H for example making assembly of the differential mechanism 20 into the case main body 11 easy. These access windows H are formed to be large so that, as is clearly shown in FIGS. 2 and 4, they reach a base portion of the flange part F in a direction along the first axis X1.

The access window H may be formed so as to be slightly spaced from the base portion of the flange part F in the axial direction (that is, the direction along the first axis X1) or may be formed so as to slightly bite into the base portion of the flange part F.

In this embodiment, of the flange part F, that present at a position outside a region A sandwiched by a pair of imaginary straight lines L1 and L2 passing through the first axis X1 and an inner end He1 on one side or an inner end He2 on the other side, in the peripheral direction of the differential case 10, of the access window H when viewed on a projection plane orthogonal to the first axis X1 (see FIG. 3) (that is, that present in a region offset from the access window H in the peripheral direction) is defined as a first flange part F1, and that positioned in the region A (that is, that present in substantially the same region as the access window H in the peripheral direction) is defined as a second flange part F2. In this case, with regard to the rigidity via which the first and second flange parts F1 and F2 are supported on the case main body 11, there is a considerable difference in degree in relation to the flange parts F1 and F2 being offset or not from the access window H in the peripheral direction as described later.

Furthermore, the ring gear R includes a rim Ra having on the outer periphery a helical gear (bevel) tooth part Rag, a disk-shaped spoke Rb projecting from an inner peripheral face of the rim Ra, and a short cylindrical hub Rc at an inner peripheral end part of the spoke Rb. In FIGS. 1, 2, 4, and 5, the tooth part Rag is shown as a cross section along the tooth line in order to simplify the illustration.

Due to having the helical gear tooth part Rag, the ring gear R receives a thrust load in a direction along the first axis X1 (thrust direction component of meshing reaction force) by meshing with the drive gear 31, which similarly has a helical gear tooth part, and this thrust load is received by the case main body 11 from the ring gear R via the flange part F.

Figure 5:
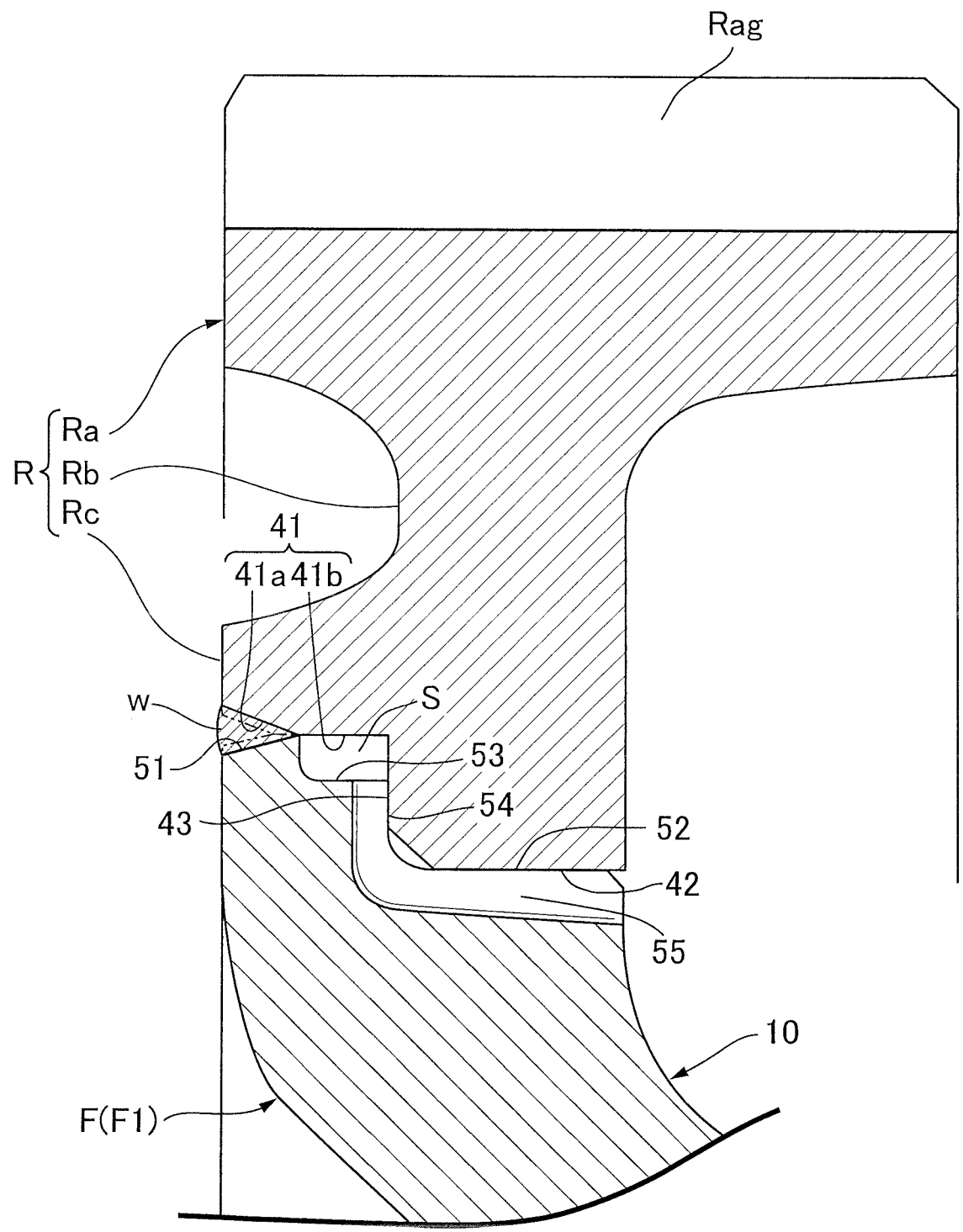
FIG. 5 is an enlarged sectional view, in a cross section passing through a degassing groove, of a joining part via which a flange part of the differential case and the ring gear are joined (an enlarged sectional view of part shown by arrow 5 in FIG. 4).
Figure 6:
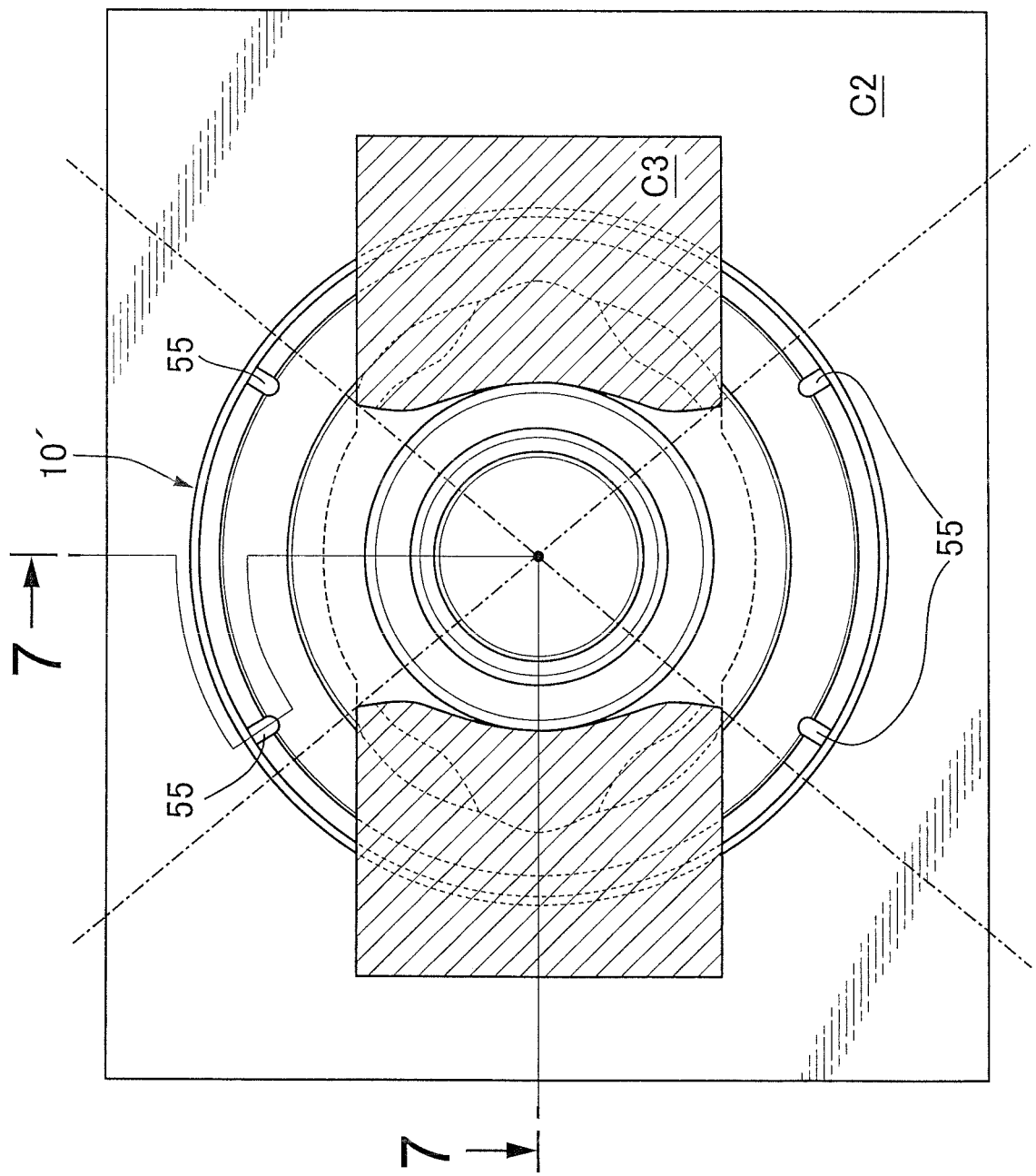
FIG. 6 is a partially cutaway sectional view showing one example of a casting mold device for molding the differential case of the first embodiment together with a differential case material immediately after casting (a sectional view along line 6-6 in FIG. 7).
Figure 7:
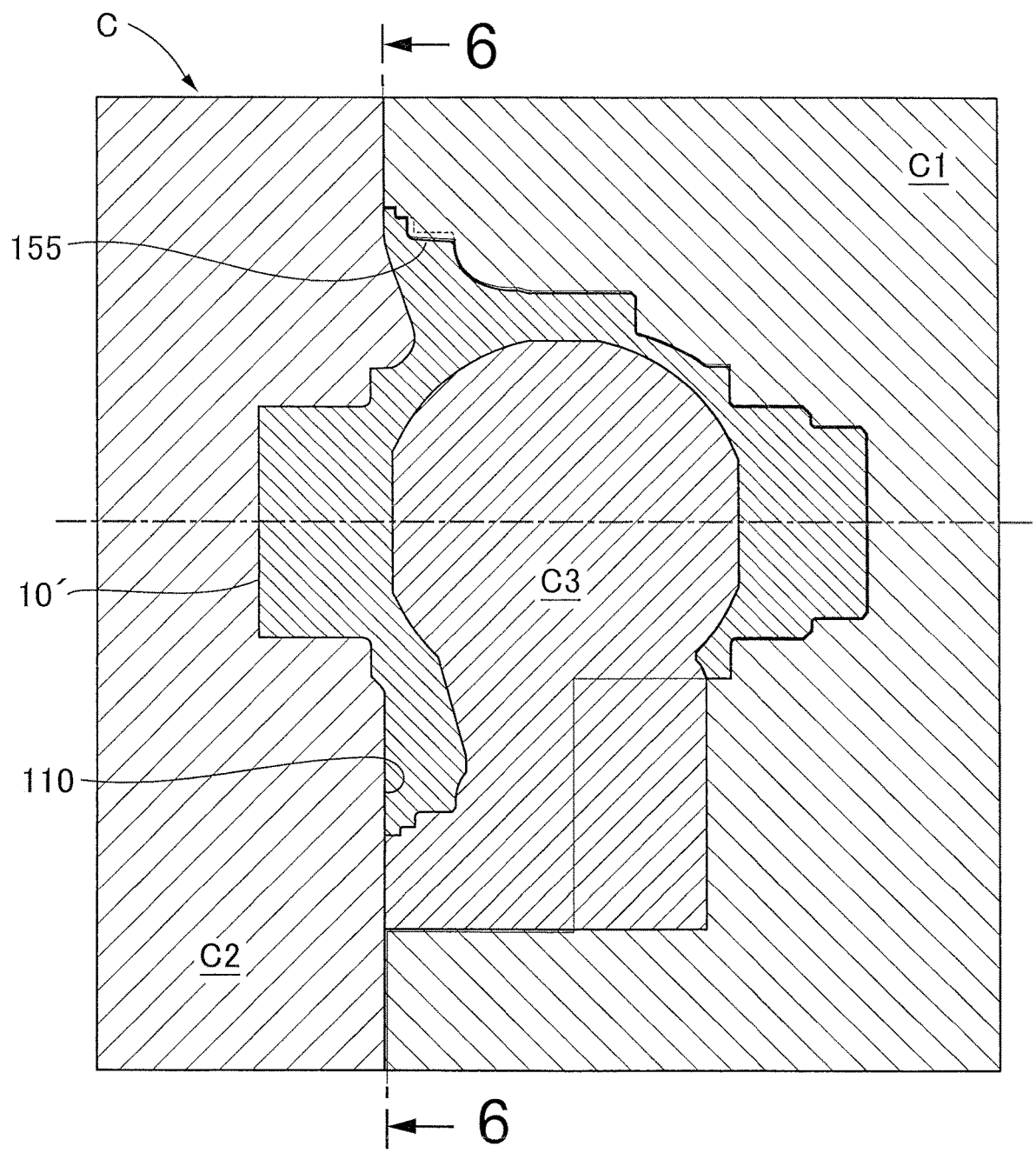
FIG. 7 is a sectional view along line 7-7 in FIG. 6.
Figure 8:
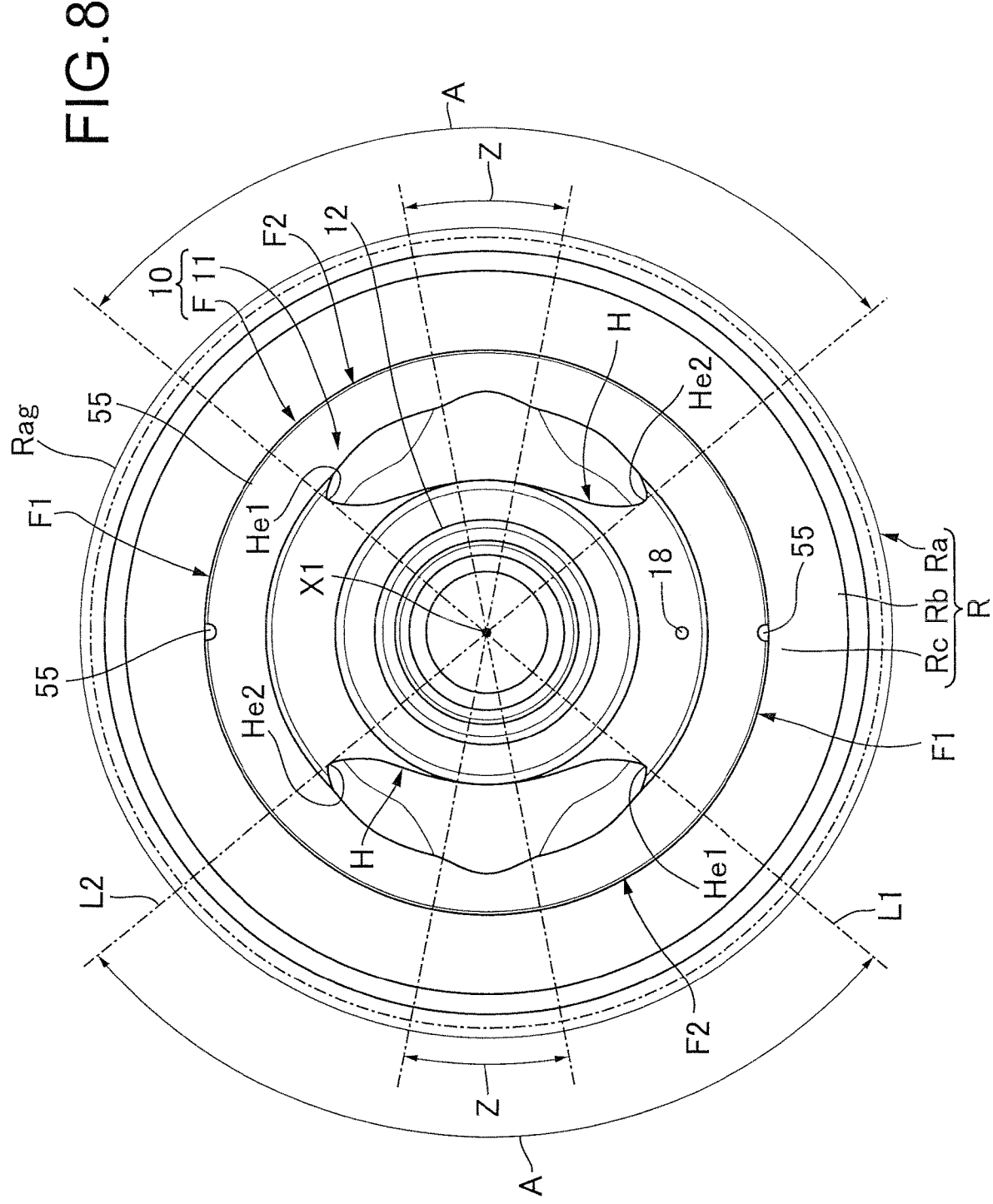
FIG. 8 is a view, corresponding to FIG. 3, showing a differential case of a second embodiment.
Figure 9:
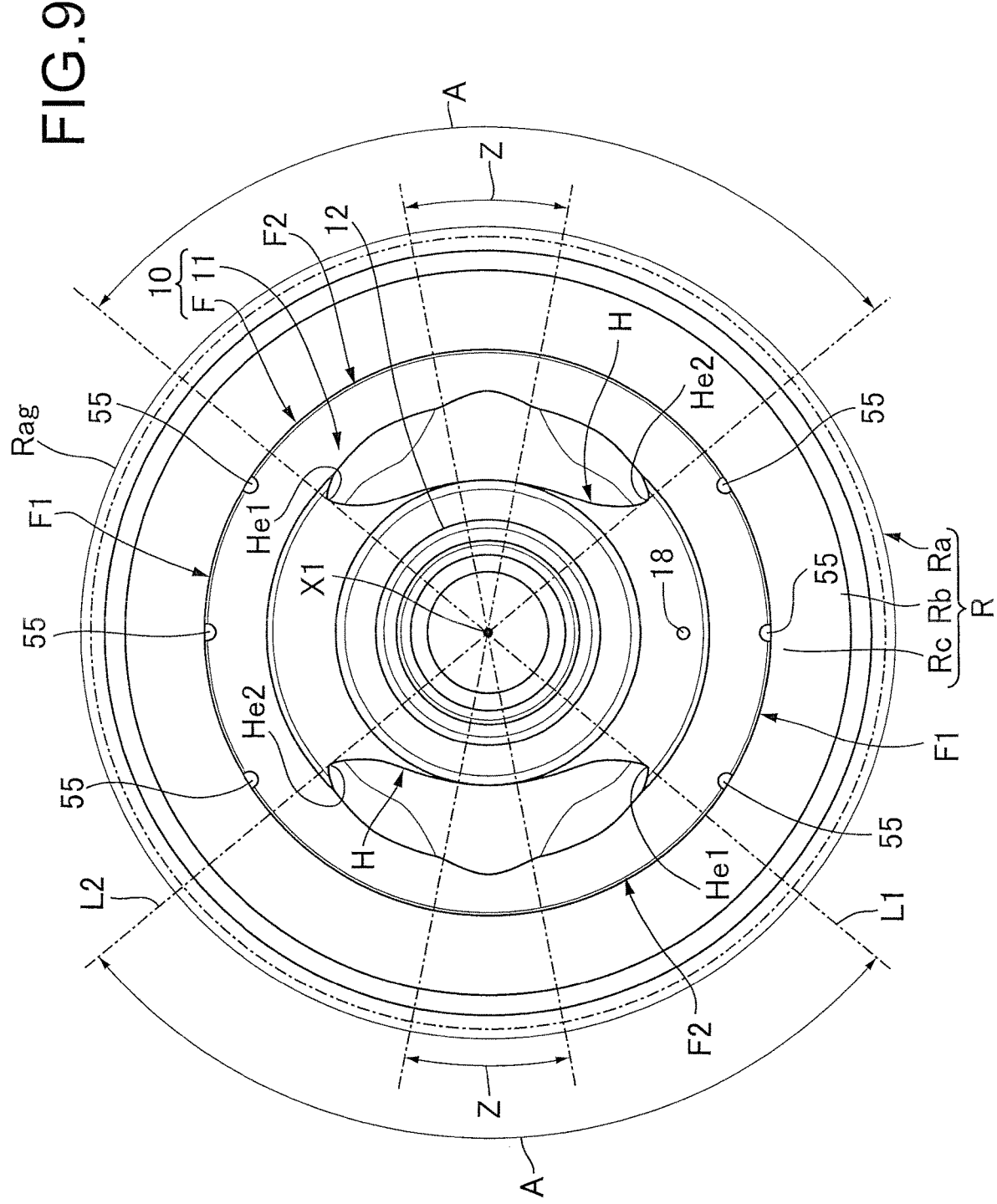
FIG. 9 is a view, corresponding to FIG. 3, showing a differential case of a third embodiment.
Figure 10:
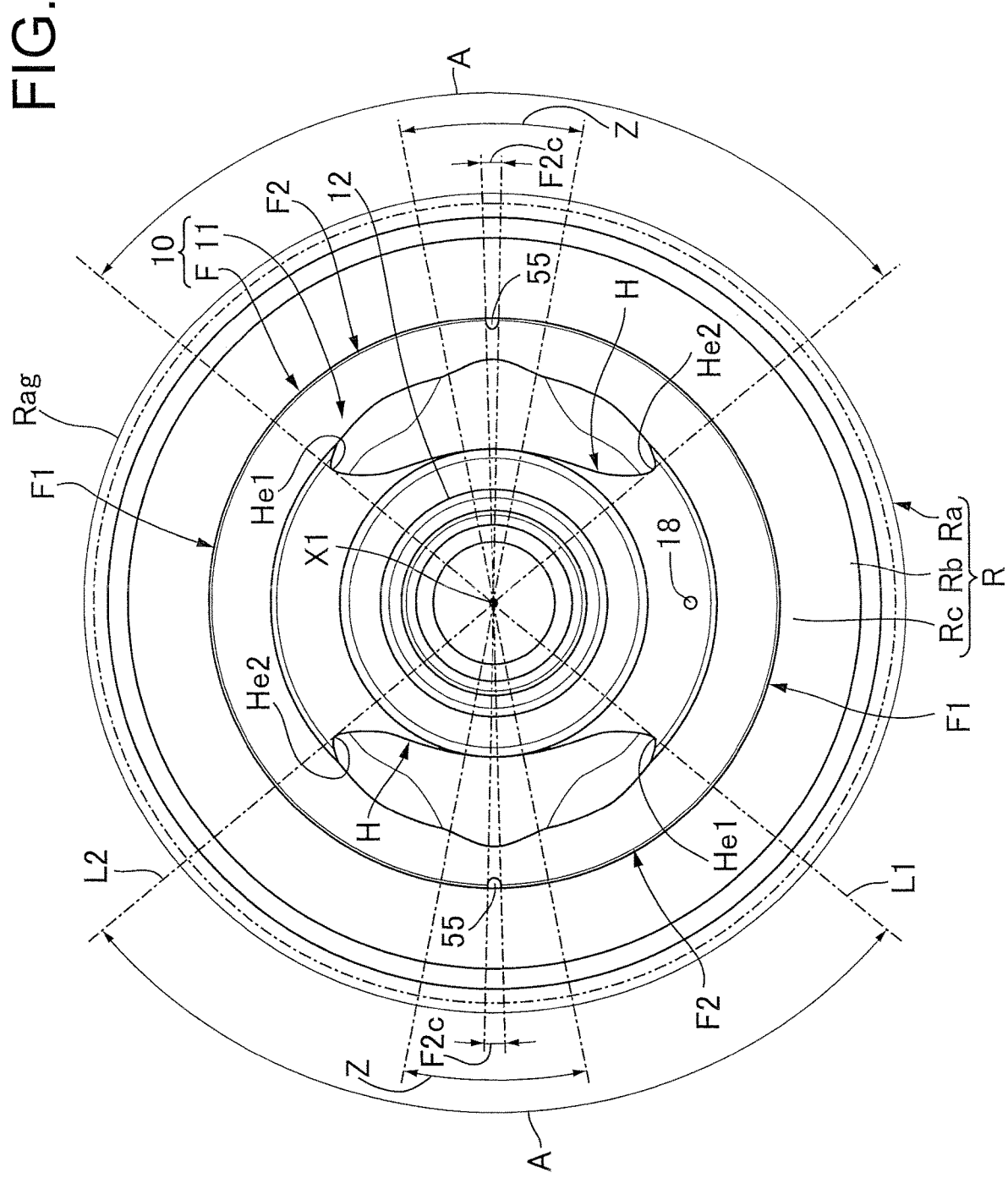
FIG. 10 is a view, corresponding to FIG. 3, showing a differential case of a fourth embodiment.
Figure 11:
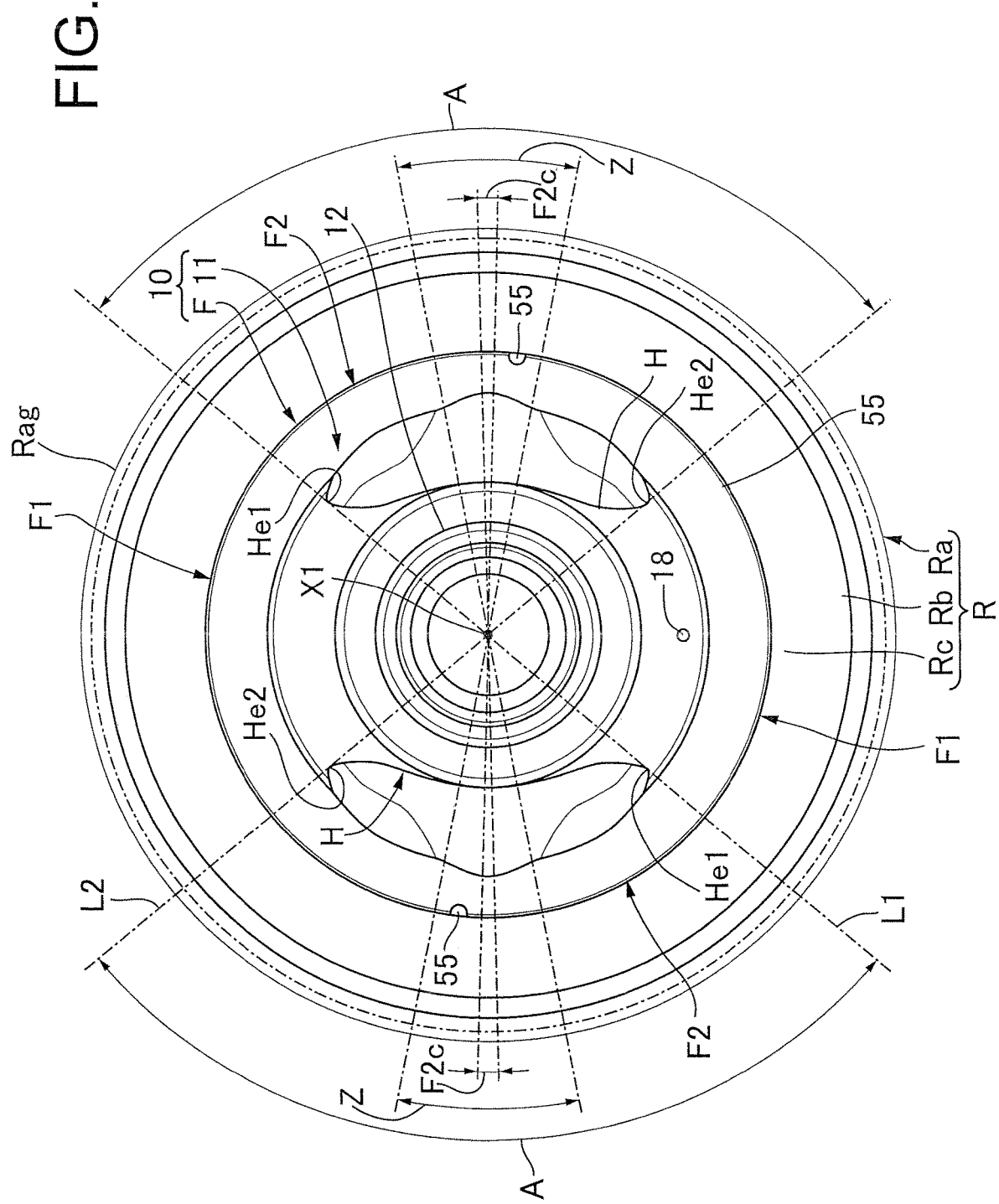
FIG. 11 is a view, corresponding to FIG. 3, showing a differential case of a fifth embodiment.

Referring in addition to FIG. 5, an inner peripheral face of the hub Rc includes in this embodiment a first inner peripheral face 41 and a second inner peripheral face 42 that is adjacent to the first inner peripheral face 41 via an annular intermediate step face 43 and has a smaller diameter than that of the first inner peripheral face 41. The first inner peripheral face 41 has an outside inner peripheral face portion 41a, which serves as a to-be-welded part, and an inside inner peripheral face portion 41b for forming a blocked space, the inside inner peripheral face portion 41b being connected to the inner end of the outside inner peripheral face portion 41a. The inner peripheral face of the hub Rc surrounds the flange part F and is fixed by welding as explained below.

That is, the outer peripheral part of the flange part F includes a joining part 51 joined by welding w to the inner peripheral face of the hub Rc (in particular the outside inner peripheral face portion 41a of the first inner peripheral face 41), a fitting face part 52 fitted into the second inner peripheral face 42 of the hub Rc by press fitting, and a space-forming part 53 positioned between the joining part 51 and the fitting face part 52 in a direction along the first axis X1. The space-forming part 53 forms an annular blocked space S between itself and the inner peripheral face of the hub Rc (in particular the inside inner peripheral face portion 41b of the first inner peripheral face 41 and the intermediate step face 43).

The space-forming part 53 is formed into an annular concave face that is one step lower further inward in the radial direction than the joining part 51 in this embodiment, and the fitting face part 52 is formed into an annular concave face that is one step lower further inward in the radial direction than the bottom of the space-forming part 53 in this embodiment. Therefore, an annular step face part 54 is formed between the fitting face part 52 and the bottom of the space-forming part 53, the step face part 54 connecting them. The step face part 54 prescribes a press fitting depth (fitting depth) by making the intermediate step face 43 of the hub Rc abut against the step face part 54 when the second inner peripheral face 42 of the hub Rc is fitted onto the fitting face part 52 of the flange part F by press fitting.

In accordance with the abutment of the intermediate step face 43 against the step face part 54, a thrust load in one direction (in this embodiment to the left in FIG. 5) acting on the ring gear R is reliably received by the flange part F, and the load borne on a part with the welding w can therefore be lessened.

The welding w is performed by laser over the entire periphery between the joining part 51 of the flange part F and the first inner peripheral face 41 of the hub Rc (in particular the outside inner peripheral face portion 41a) from the second bearing boss 13 side (the left side in FIG. 5). As illustrated by a double-dotted broken line in FIG. 5, providing a groove (that is, tapered faces to make the extremities spread from each other) on the joining part 51 and the outside inner peripheral face portion 41a prior to welding is advantageous in terms of smoothly carrying out the welding operation (for example, supply of a welding material, etc.).

As is clearly shown in FIG. 1 to FIG. 5, the flange part F is provided with a degassing groove 55 as a degassing passage providing communication between the blocked space S and an outer face of the differential case 10. The degassing groove 55 functions so as to smoothly discharge to the exterior of the differential case 10 welding gas generated within the blocked space S when joining the joining part 51 and the first inner peripheral face 41 by the welding w as described above. Therefore, the occurrence of welding faults due to welding gas not being smoothly discharged from the blocked space S can be prevented by the effect of the degassing groove 55 in discharging gas.

Furthermore, in this embodiment the degassing groove 55 extends in an L shape so as to straddle the fitting face part 52 and the step face part 54, the inner end of the degassing groove 55 opens on the bottom of the space-forming part 53, and the outer end of the degassing groove 55 opens on a side face, on the first bearing boss 12 side, of the flange part F.

Moreover, also shown in FIG. 3 and FIG. 8 to FIG. 13, the degassing groove 55 is disposed only in at least one of the first flange part F1 and a predetermined region Z, spaced in the peripheral direction from a border part with the first flange part F1, of the second flange part F2 (that is, a portion that the imaginary straight lines L1 and L2 transect when viewed on a projection plane orthogonal to the first axis X1 in FIG. 3).

Figure 12:
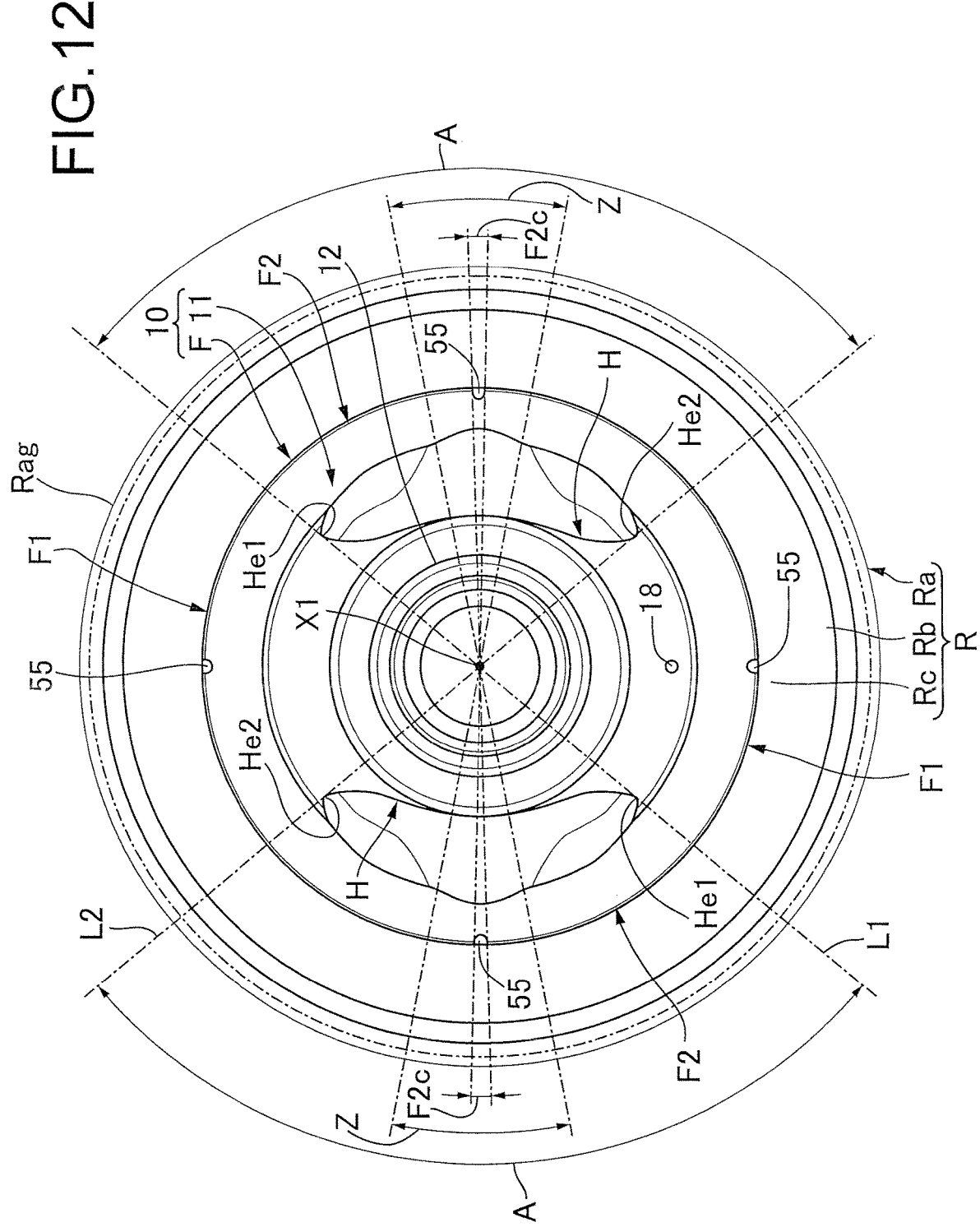
FIG. 12 is a view, corresponding to FIG. 3, showing a differential case of a sixth embodiment.
Figure 13:
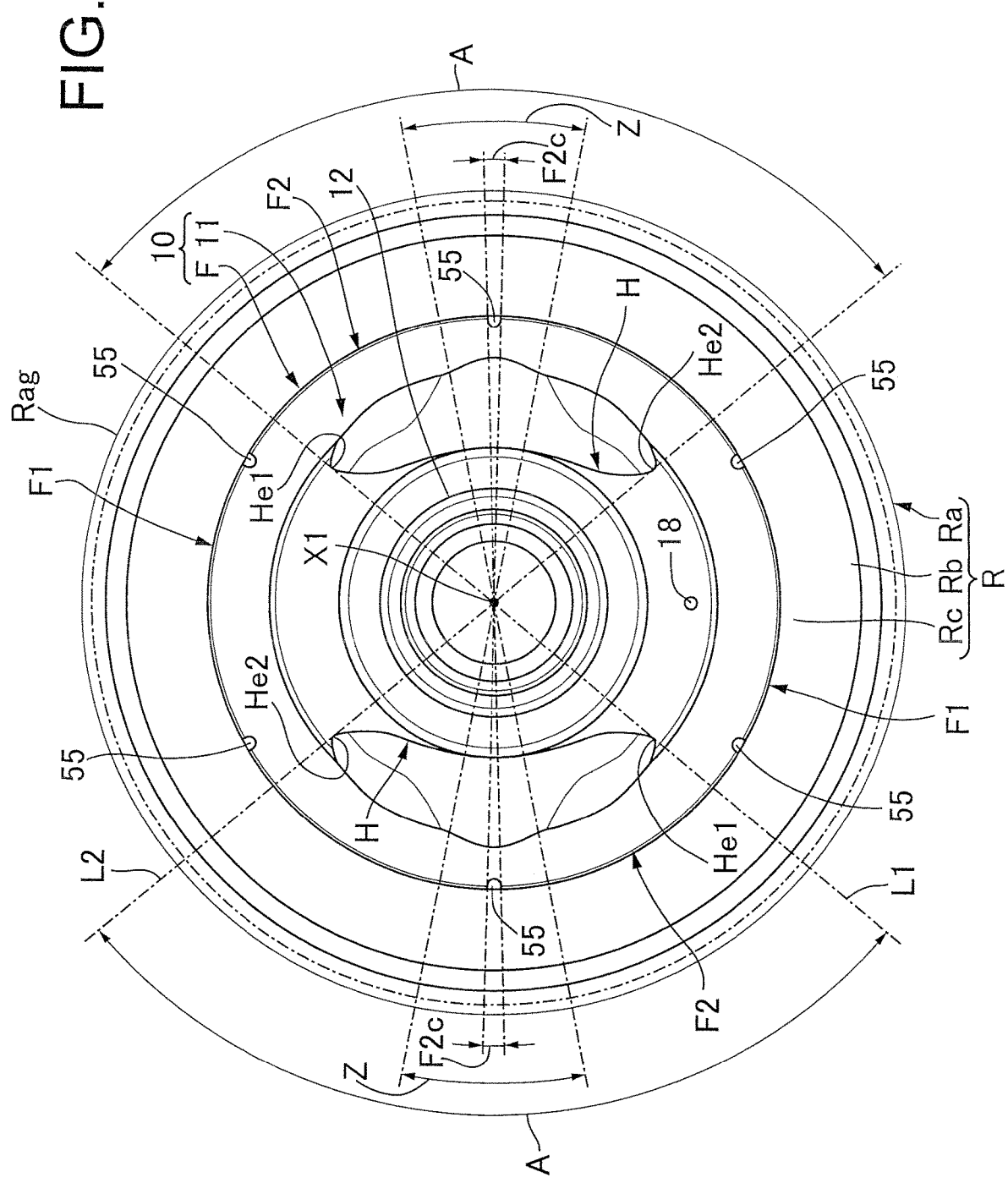
FIG. 13 is a view, corresponding to FIG. 3, showing a differential case of a seventh embodiment.

That is, the arrangement mode of the degassing groove 55 is any one of an arrangement mode in which it is disposed only in the first flange part F1 (e.g. first to third embodiments shown in FIG. 3, FIG. 8, and FIG. 9 respectively), an arrangement mode in which it is disposed only in the predetermined region Z of the second flange part F2 (e.g. fourth and fifth embodiments shown in FIG. 10 and FIG. 11 respectively), and an arrangement mode in which it is disposed only in both of the first flange part F1 and the predetermined region Z (e.g. sixth and seventh embodiments shown in FIG. 12 and FIG. 13 respectively).

The structures of the differential cases 10 illustrated in the second to seventh embodiments shown in FIG. 8 to FIG. 13 are similar to the structure of the differential case 10 of the first embodiment shown in FIG. 1 to FIG. 5 except for differences in the position of the degassing groove 55. Constituent elements of the second to seventh embodiments corresponding to the constituent elements of the first embodiment are denoted by the same reference numerals and symbols in FIG. 8 to FIG. 13, further detailed explanation thereof being omitted.

The predetermined region Z is set with setting conditions that it is a region where the concentration of stress in an area around the degassing groove 55 present in the predetermined region Z of the second flange part F2 can be avoided when a thrust load from the ring gear R (in particular a rightward thrust load) acts on the flange part F while the differential device D is operating so as to generate a stress resisting inclination of the flange part F toward the first axis X1 side (hereinafter, simply called 'inclination stress' in this specification).

With regard to the predetermined region Z, the range of the region in the peripheral direction varies depending on various factors that differ for each type of device (for example, the dimensions of the access window H, the structure of a portion via which the case main body 11 and the base portion of the second flange part F2 are connected outside the access window H, the cross-sectional shape of the degassing groove 55, etc.), and the predetermined region Z can be experimentally determined for each type of device by measuring the actual stress distribution in an area around the degassing groove 55 of the second flange part F2 when a thrust load acts thereon.

Furthermore, the predetermined region Z naturally includes a middle part F2c in the peripheral direction of the second flange part F2, and for example a region adjacent to the middle part F2c in the peripheral direction or the region outside it is also included as long as the region satisfies the above setting conditions. For example, in the fourth, sixth, and seventh embodiments shown in FIG. 10, FIG. 12, and FIG. 13 respectively, the degassing groove 55 is disposed in the middle part F2c, but in the fifth embodiment shown in FIG. 11 the degassing groove 55 is disposed in a region further outside than the middle part F2c although it is within the predetermined region Z. In particular, as in the fourth, sixth, and seventh embodiments, when the degassing groove 55 is disposed in the middle part F2c of the second flange part F2, since the degassing groove 55 is present in a portion, where the difference in stress in the peripheral direction (in other words, the change gradient in the peripheral direction of the amount of inclination of the second flange part F2) is a minimum, of the second flange part F2, it becomes possible to reliably avoid a concentration of stress in an area around the degassing groove 55.

In this way, in the present invention, an embodiment in which the degassing groove 55 is disposed only in at least one of the first flange part F1 and the middle part F2c in the peripheral direction of the second flange part F2 is feasible. In this case, the degassing groove 55 is disposed only in the first flange part F1, only in the middle part F2c of the second flange part F2, or only in the first flange part F1 and the middle part F2c of the second flange part F2.

With regard to the above degassing groove 55, it is desirable that a plurality thereof may be present and arranged at equal intervals in the peripheral direction of the differential case 10 (see for example the second and fourth to seventh embodiments shown in FIG. 8 and FIG. 10 to FIG. 13 respectively). In this case, due to there being a plurality of degassing grooves 55, it is possible, by making the cross-sectional area of each degassing groove 55 as small as possible while ensuring that there is a necessary degassing effect, to further reduce the difference in stress (that is, the difference in amount of inclination) between one end and the other end in the peripheral direction of the degassing groove 55 of the flange part F, and a concentration of stress in the area around the degassing groove 55 can reliably be avoided. Moreover, due to the plurality of degassing grooves 55 being disposed at equal intervals in the peripheral direction of the differential case 10, the degassing effect can be made substantially uniform regardless of the position of the welding.

The operation of the first embodiment is now explained.

The differential case 10 is cast using a casting mold device C that is formed in a divided manner from first to third molds C1 to C3, as a plurality of molds, in this embodiment. A differential case material 10' immediately after being cast is finished as the differential case 10 by appropriately subjecting it to machining at required positions (e.g. bearing holes of the first and second bearing bosses 12 and 13, an outer peripheral face of the flange part F, etc.).

The casting mold device C includes for example the first mold C1 for molding the majority of an outer face of the differential case 10 from the first bearing boss 12 up to the outer peripheral face of the flange part F, the second mold C2 for molding an outer face of the differential case 10 from the second bearing boss 13 up to the left side face of the flange part F, and the third mold C3 for molding the hollow part and the access window H of the differential case 10 and an outer peripheral face and a right side face of the majority of the second flange part F2, the third mold C3 being a sand core.

Figure 14:
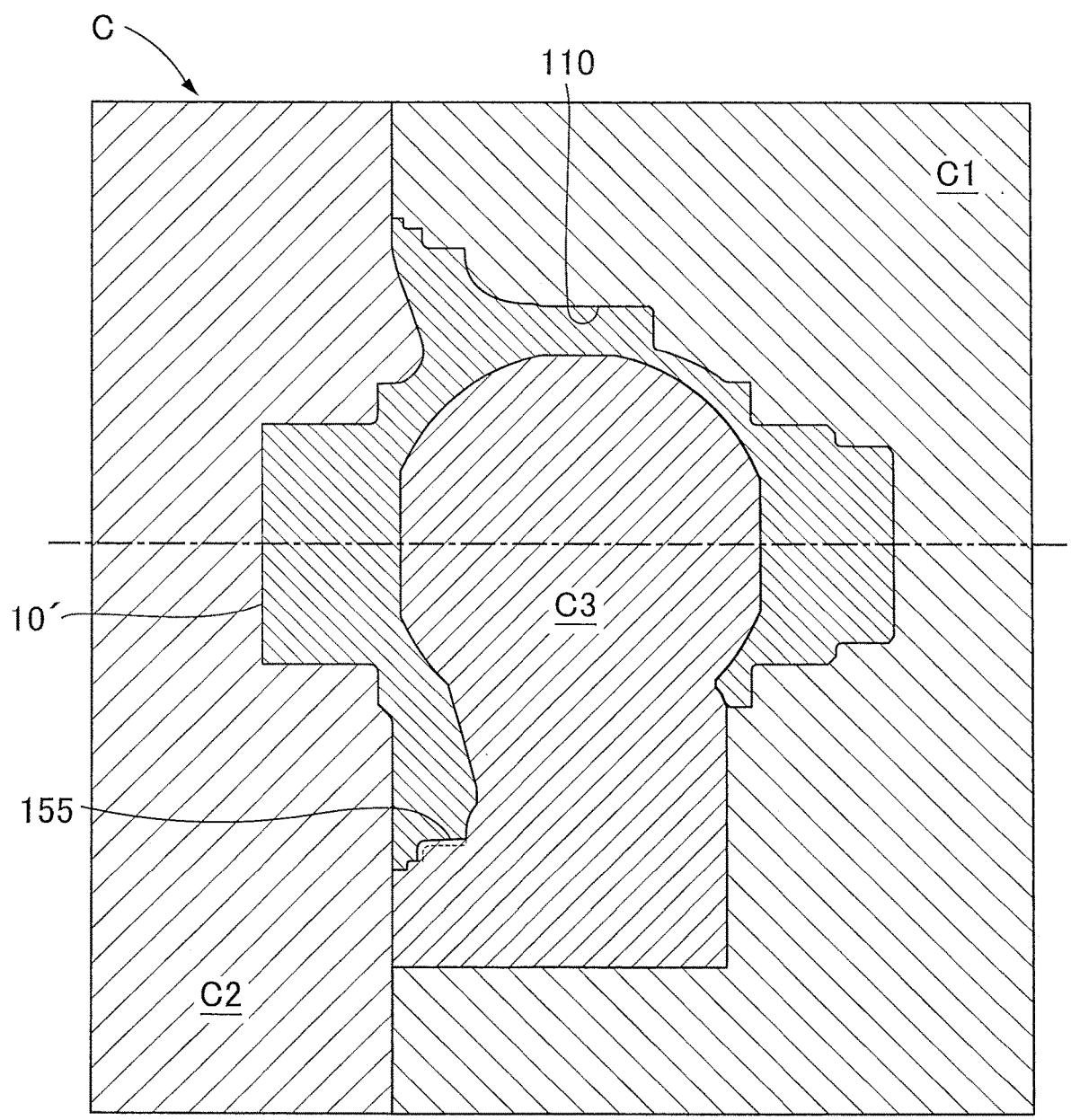
FIG. 14 is a view, corresponding to FIG. 7, showing one example of a casting mold device for molding the differential case of the fourth embodiment.

The first to third molds C1 to C3 are formed so as to define a differential case molding cavity 110 therebetween in a state in which they are closed. A plurality of groove molding parts 155 for the molding of each of the plurality of degassing grooves 55 are provided only at corresponding positions of the first mold C1 in the first to third embodiments (see FIG. 3, FIG. 8, FIG. 9, FIGS. 6 and 7) in which the degassing groove 55 is disposed only in the first flange part F1 in particular, and only at corresponding positions of the third mold C3 in the fourth and fifth embodiments (see FIG. 10, FIG. 11, and FIG. 14) in which the degassing groove 55 is disposed only in the second flange part F2 in particular.

When all of the plurality of degassing grooves 55 are provided in a concentrated manner on any one of the plurality of molds C1 to C3 (the first mold C1 or the third mold C3) as in the first to fifth embodiments, compared with a case in which the groove molding parts 155 are provided in a divided manner in the plurality of molds C1 and C3 as in the sixth and seventh embodiments (see FIG. 12 and FIG. 13), there are the advantages that variation of position among the plurality of degassing grooves 155 can be suppressed, and the precision of molding of the degassing groove 155 can be enhanced.

In the differential case 10 produced as above, the second inner peripheral face 42 of the hub Rc of the ring gear R is fitted onto the fitting face part 52 on the outer periphery of the flange part F by press fitting, and the press fitting depth is restricted by the intermediate step face 43 on the inner periphery of the hub Rc abutting against the step face part 54 on the outer periphery of the flange part F when carrying out press fitting. In this state, the welding w is performed from the second bearing boss 13 side by laser over the entire periphery between opposing faces of the joining part 51 on the outer periphery of the flange part F and the inner peripheral face of the hub Rc (in particular the outside inner peripheral face portion 41a of the first inner peripheral face 41).

This enables the strength with which the flange part F and the hub Rc are joined to be enhanced even while the welding operation is carried out only on one face side of the flange part F and the hub Rc (the left side face in the embodiment), and the efficiency of the welding operation can be improved, thus reducing the production cost. Moreover, since the said one face side on which the flange part F and the hub Rc are welded is the side opposite to the access window H of the case main body 11, there is no possibility that sputter generated during welding will enter the interior of the differential case 10 from the access window H.

While torque is being transmitted between the drive gear 31 and the ring gear R, a thrust load in a direction along the first axis X1 acts on the ring gear R having the helical tooth part Rag, and the orientation of the load changes according to switching the automobile between forward and reverse. In particular, when a rightward thrust load acts on the ring gear R, a thrust load facing in the same direction is also transmitted from the ring gear R to the flange part F of the differential case 10, and the thrust load causes inclination stress in the flange part F.

On the other hand, the rigidity with which the first and second flange parts F1 and F2 are supported on the case main body 11 has a considerable difference in degree due to the influence of the access window H. That is, compared with the rigidity of the first flange part F1 present at a position offset from the access window H in the peripheral direction and strongly supported by the differential case main body 11, the rigidity of the second flange part F2, which is present at a position close to and corresponding to the access window H (that is, the same position in the peripheral direction as the access window H, in other words a position that is not offset) and for which strong support by the differential case main body 11 cannot be anticipated is considerable low.

Because of this, when the flange part F receives a thrust load from the ring gear R and is subjected to inclination stress as described above, in particular in a region, relatively close to the border part with the first flange part F1, of the second flange part F2 (that is, a portion that the imaginary straight lines L1 and L2 transect when viewed on a projection plane orthogonal to the first axis X1), compared with a region close to the middle part F2c in the peripheral direction of the second flange part F2 (for example the predetermined region Z), the difference in stress in the peripheral direction in relation to the difference in rigidity between the first and second flange parts F1 and F2 (in other words, the change gradient in the peripheral direction of the amount of inclination when the second flange part F2 is about to incline slightly) is large.

Figure 15:
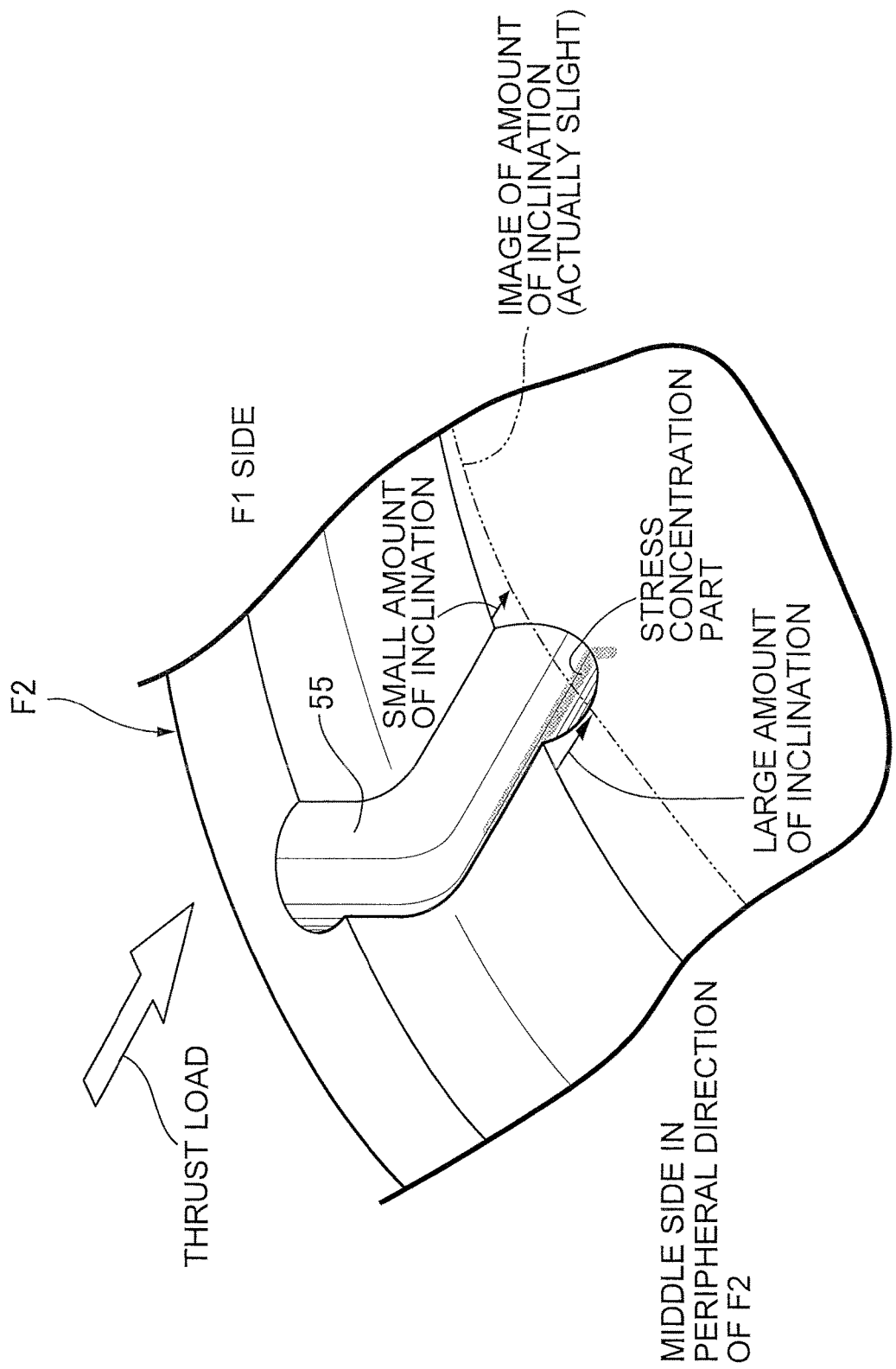
FIG. 15 is a perspective view showing an outer peripheral part of a second flange part and a schematic diagram for explaining the principle via which a concentration of stress occurs in an area around the degassing groove when the groove is disposed in a region close to the border between first and second flange parts.

If the degassing groove 55 were to be disposed in a region where the difference in stress of the second flange part F2 (that is, the change gradient in the peripheral direction of the amount of inclination) is large, as shown in for example FIG. 15, the amount of inclination would be considerably different between one end and the other end in the peripheral direction of the degassing groove 55. Because of this, due to the difference in the amount of inclination, a concentration of stress would easily occur in an area around the degassing groove 55 of the second flange part F2 (in particular the groove bottom part), and there is a possibility that the durability of the differential case 10 would be degraded. FIG. 15 exaggeratedly illustrates the amount of displacement by inclination of the second flange part F2 with a double-dotted broken line in order to facilitate understanding of the principle of the present invention, but the actual amount of inclination is very small.

On the other hand, the degassing groove 55 of the present embodiments is disposed only on at least one of the first flange part F1 and the predetermined region Z, spaced in the peripheral direction from the border part with the first flange part F1, of the second flange part F2 (in particular, the middle part F2c in the fourth, sixth, and seventh embodiments), and the predetermined region Z is set to be a region in which the concentration of stress in an area around the degassing groove 55 present in the predetermined region Z can be avoided when inclination stress is generated in the flange part F with a thrust load. This allows the degassing groove 55 to be disposed in a region of the flange part F where there is no or hardly any difference in stress in the peripheral direction (that is, the change gradient in the peripheral direction of the amount of inclination) when inclination stress is generated, thus enabling a concentration of stress in an area around the degassing groove 55 of the second flange part F2 to be avoided and improving the durability of the differential case 10.

The first to seventh embodiments of the present invention are explained above, but the present invention is not limited by these embodiments and may be modified in a variety of ways as long as the modifications do not depart from the gist of the present invention.

For example, in the embodiments above, the differential device D is applied to a differential device for a vehicle, but in the present invention the differential device D may be applied to various types of mechanical devices other than a vehicle.

Furthermore, in the embodiment there is a difference in height (step face part 54) between the joining part 51 provided on the outer peripheral part of the flange part F and the fitting face part 52 adjacent thereto with the space-forming part 53 therebetween, but the present invention can be implemented for an arrangement in which there is no difference in height (that is, the joining part 51 and the step face part 54 are arranged on the same or substantial the same cylindrical plane with the space-forming part 53 therebetween).

Moreover, in the embodiment the fitting face part 52 on the outer periphery of the flange part F is fitted into and fixed to the inner peripheral face (second inner peripheral face 42) of the hub Rc of the ring gear R by press fitting, but in the present invention the fitting face part 52 may be fitted into and fixed to the inner peripheral face (second inner peripheral face 42) of the hub Rc by light press fitting or may be fitted into the inner peripheral face (second inner peripheral face 42) of the hub Rc with zero or a very small allowance.

Furthermore, in the embodiment the welding w between the ring gear R and the flange part F of the differential case 10 is performed by laser welding, but in the present invention welding may be performed by another welding method (e.g. electronic beam welding, etc.).

Moreover, in the embodiment the degassing groove 55 is illustrated as the degassing passage provided in the flange part F, but the degassing passage of the present invention is not limited to a groove. For example, a hole provided in a flange part F so as to provide communication between the blocked space S and an outer face of the differential case 10 may serve as the degassing passage.

Furthermore, in the embodiment the tooth part Rag of the ring gear R is illustrated as a helical gear, but the ring gear of the present invention may be any gear such as for example a bevel gear or a hypoid gear as long as it has a tooth shape that receives a thrust load in a direction along the first axis X1 by meshing at least with the drive gear 31.

What is claimed is:

1. A differential device comprising
a differential case that has a hollow case main body and an annular flange part projectingly provided integrally with an outer peripheral face of the case main body and that is rotatable around a predetermined axis,
a differential mechanism that is housed within the case main body,
an access window that is provided in the case main body on one side, in a direction along the axis, of the flange part in order to allow the differential mechanism to be assembled into the case main body, and
a ring gear that meshes with a drive gear linked to a power source and transmits power from the drive gear to the differential case,
the ring gear having a tooth part that receives a thrust load in a direction along the axis by meshing with the drive gear,
an outer peripheral part of the flange part having a joining part joined to an inner peripheral face of the ring gear by welding, a fitting face part fitted into the inner peripheral face of the ring gear, and a space-forming part positioned between the joining part and the fitting face part and forming a blocked space between the outer peripheral part of the flange part and the inner peripheral face of the ring gear,
a degassing passage being provided in the flange part, and the degassing passage providing communication between the blocked space and an outer face of the differential case,
wherein the flange part comprises a first flange part and a second flange part, the first flange part being positioned outside a region sandwiched by a pair of imaginary straight lines passing through the axis and inner ends, on one side and on an other side in a peripheral direction of the differential case, of the access window when viewed on a projection plane orthogonal to the axis, and the second flange part being positioned in the region,
the second flange part includes a predetermined region spaced in the peripheral direction from a border part with the first flange part, the predetermined region being a region that can avoid a concentration of stress in an area around the degassing passage present in the predetermined region when a thrust load acts on the flange part so as to give rise to stress resisting inclination of the flange part toward the axis side, and
the degassing passage is disposed only in the first flange part, or only in the predetermined region of the second flange part, or only in the first flange part and the predetermined region out of an entire periphery of the flange part.

2. The differential device according to claim 1, wherein a plurality of the degassing passages are present and disposed at equal intervals in the peripheral direction.

3. The differential device according to claim 2, in which the differential case is cast using a plurality of molds that can define a molding cavity for the differential case therebetween,
wherein all of a plurality of groove molding parts for respectively molding a plurality of degassing passages provided in an outer peripheral part of the flange part are provided on any one of the plurality of molds.

4. The differential device according to claim 1, in which the differential case is cast using a plurality of molds that can define a molding cavity for the differential case therebetween,
wherein all of a plurality of groove molding parts for respectively molding a plurality of degassing passages provided in an outer peripheral part of the flange part are provided on any one of the plurality of molds.

5. A differential device comprising
a differential case that has a hollow case main body and an annular flange part projectingly provided integrally with an outer peripheral face of the case main body and that is rotatable around a predetermined axis,
a differential mechanism that is housed within the case main body,
an access window that is provided in the case main body on one side, in a direction along the axis, of the flange part in order to allow the differential mechanism to be assembled into the case main body, and
a ring gear that meshes with a drive gear linked to a power source and transmits power from the drive gear to the differential case,
the ring gear having a tooth part that receives a thrust load in a direction along the axis by meshing with the drive gear,
an outer peripheral part of the flange part having a joining part joined to an inner peripheral face of the ring gear by welding, a fitting face part fitted into the inner peripheral face of the ring gear, and a space-forming part positioned between the joining part and the fitting face part and forming a blocked space between the outer peripheral part of the flange part and the inner peripheral face of the ring gear,
a degassing passage being provided in the flange part, and the degassing passage providing communication between the blocked space and an outer face of the differential case,
wherein the flange part comprises a first flange part and a second flange part, the first flange part being positioned outside a region sandwiched by a pair of imaginary straight lines passing through the axis and inner ends, on one side and on an other side in a peripheral direction of the differential case, of the access window when viewed on a projection plane orthogonal to the axis, and the second flange part being positioned in the region, and
the degassing passage is disposed only in the first flange part, or only in a middle part in in the peripheral direction of the second flange part, or only in the first flange part and the middle part out of an entire periphery of the flange part.

6. The differential device according to claim 5, wherein a plurality of the degassing passages are present and disposed at equal intervals in the peripheral direction.

7. The differential device according to claim 6, in which the differential case is cast using a plurality of molds that can define a molding cavity for the differential case therebetween,
wherein all of a plurality of groove molding parts for respectively molding a plurality of degassing passages provided in an outer peripheral part of the flange part are provided on any one of the plurality of molds.

8. The differential device according to claim 5, in which the differential case is cast using a plurality of molds that can define a molding cavity for the differential case therebetween,
wherein all of a plurality of groove molding parts for respectively molding a plurality of degassing passages provided in an outer peripheral part of the flange part are provided on any one of the plurality of molds.

* * * * *